US011360191B2

United States Patent
Izadian et al.

(10) Patent No.: US 11,360,191 B2
(45) Date of Patent: Jun. 14, 2022

(54) ADAPTIVE TILTING RADARS FOR EFFECTIVE VEHICLE CONTROLS

(71) Applicant: Woven Planet North America, Inc., Los Altos, CA (US)

(72) Inventors: Jamaledin Izadian, San Jose, CA (US); Mohammad Emadi, San Jose, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 204 days.

(21) Appl. No.: 16/729,106

(22) Filed: Dec. 27, 2019

(65) Prior Publication Data
US 2021/0199758 A1 Jul. 1, 2021

(51) Int. Cl.
*G01S 7/40* (2006.01)
*G01S 13/931* (2020.01)
*G01S 13/00* (2006.01)

(52) U.S. Cl.
CPC .......... *G01S 7/4026* (2013.01); *G01S 13/931* (2013.01); *G01S 7/403* (2021.05); *G01S 7/4034* (2021.05); *G01S 2013/93273* (2020.01)

(58) Field of Classification Search
CPC .................................................... G01S 13/878
See application file for complete search history.

(56) References Cited

U.S. PATENT DOCUMENTS

| | | | | |
|---|---|---|---|---|
| 6,356,229 B1 * | 3/2002 | Schneider | ............. | G01S 13/931 342/70 |
| 6,975,265 B2 * | 12/2005 | Schlick | ................. | G01S 13/878 342/165 |
| 7,706,978 B2 * | 4/2010 | Schiffmann | .......... | G01S 7/4026 701/301 |
| 8,344,940 B2 * | 1/2013 | Jeong | .................... | G01S 7/4026 342/75 |
| 9,733,348 B2 | 8/2017 | Gazit | | |
| 10,509,127 B2 | 12/2019 | England | | |
| 2004/0080450 A1 | 4/2004 | Cheong | | |
| 2007/0115169 A1 * | 5/2007 | Kai | ........................ | G01S 7/4026 342/174 |

(Continued)

FOREIGN PATENT DOCUMENTS

| | | |
|---|---|---|
| JP | 2004144671 A | 5/2004 |
| KR | 20150108680 A | 9/2015 |

OTHER PUBLICATIONS

International Search Report and Written Opinion for International Application No. PCT/US2020/066805, dated Apr. 2, 2021.

*Primary Examiner* — Bernarr E Gregory
(74) *Attorney, Agent, or Firm* — Christopher G. Darrow; Darrow Mustafa PC

(57) ABSTRACT

In one embodiment, a method includes accessing sensor data generated by one or more sensors of the vehicle, determining that a first beam angle of a radar of the vehicle provides insufficient radar visibility of a current road condition according to one or more criteria based on the sensor data, determining an amount of adjustment needed to adjust the first beam angle of the radar, adjusting the first beam angle of the radar to a second beam angle based on the determined amount of adjustment, and detecting one or more objects based on the second beam angle of the radar.

20 Claims, 7 Drawing Sheets

(56) References Cited

U.S. PATENT DOCUMENTS

| | | | | |
|---|---|---|---|---|
| 2010/0057293 A1* | 3/2010 | Hoetzer | ............... | G01S 13/931 |
| | | | | 701/29.2 |
| 2012/0150386 A1* | 6/2012 | Armbrust | .............. | G01S 13/931 |
| | | | | 701/36 |
| 2012/0235851 A1* | 9/2012 | Park | ..................... | G01S 13/931 |
| | | | | 342/70 |
| 2013/0154870 A1* | 6/2013 | Mills | .................... | G01S 7/4026 |
| | | | | 342/70 |
| 2013/0154871 A1* | 6/2013 | Gaboury | .............. | G01S 7/4026 |
| | | | | 342/82 |
| 2014/0333473 A1* | 11/2014 | Steinbuch | ............ | G01S 7/4026 |
| | | | | 342/174 |
| 2015/0301159 A1* | 10/2015 | Scheschko | ........... | G01S 7/4026 |
| | | | | 342/174 |
| 2017/0031363 A1* | 2/2017 | Laur | ..................... | G01S 13/931 |
| 2017/0328729 A1* | 11/2017 | Zhu | ...................... | G01S 13/931 |
| 2019/0146514 A1 | 5/2019 | Son | | |

* cited by examiner

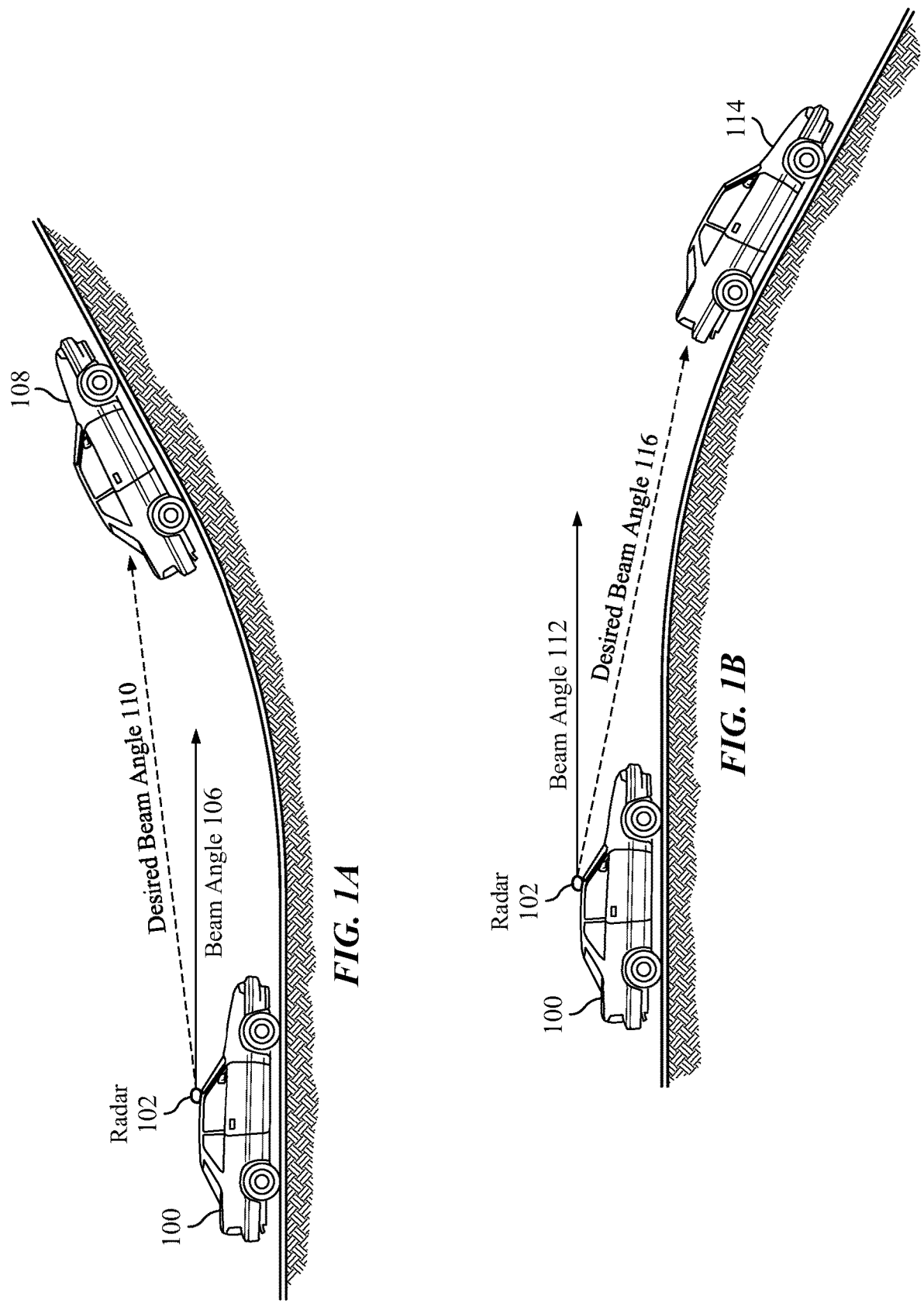

ADAPTIVE TILTING RADARS FOR EFFECTIVE VEHICLE CONTROLS

BACKGROUND

Transportation management systems and/or autonomous driving systems may need to determine a variety of information about a vehicle and the geographic area where the vehicle is operating. Such information may be important for safe operation of vehicles. For example, accurately detecting pedestrians or other vehicles surrounding a driving vehicle is essential for vehicle controls in transportation management systems and/or autonomous driving systems. Safe operation of vehicles, in turn, will not only decrease the risk of road accidents but also reduce fuel consumption significantly. Transportation management systems and/or autonomous driving systems may need to analyze complex scenarios and correctly respond to multiple potential hazard. Among others, radar (Radio Detection and Ranging) systems may provide important sensor input for safe and reliable vehicle operations because they combine high resolution in range and depth perception, with the detection of objects like pedestrians, bicycles, and other vehicles. Radar systems use radio waves for long-range object and obstacle detection, as well as for tracking the velocity and direction of the various actors such as pedestrians, other vehicles, guardrails, etc., in the environment around the vehicle. Ensuring that these radar systems operate without interference, cover the intended areas, do not fail from installation effects and provide accurate input to the control system for vehicle operations requires the usage of advanced technologies.

In vehicle operations where a radar is installed on a vehicle, the radar is moving together with the vehicle. As a result, detecting objects surrounding the vehicle using the radar system is much more complicated than detecting objects using stationary radar. In particular, the ground where the vehicle is moving is usually uneven, for which the movement of the vehicle may cause an unwanted pitch of the radar. When such a pitch occurs, the radar may detect a lot of false targets especially in nearby regions, which may affect the overall performance of vehicle operations.

BRIEF DESCRIPTION OF THE DRAWINGS

FIG. 1A illustrates an example change of road that causes misdetection of an object.

FIG. 1B illustrates another example change of road that causes misdetection of an object.

DESCRIPTION OF EXAMPLE EMBODIMENTS

Figure 1C:
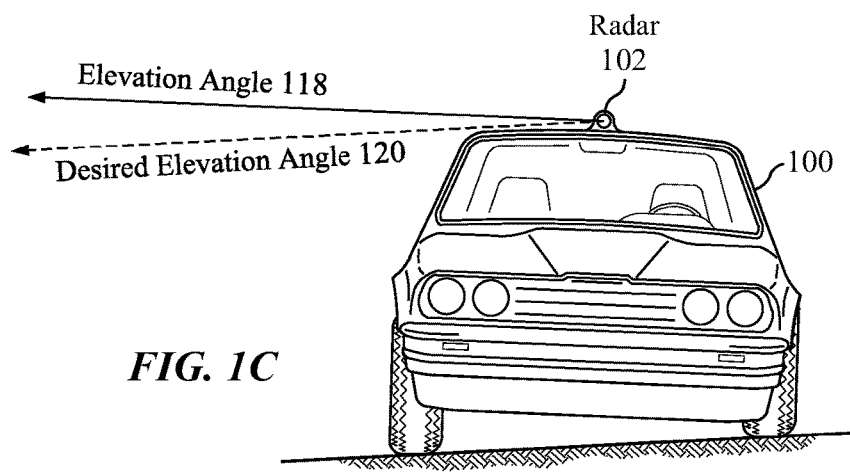
FIG. 1C illustrates another example change of road that causes misdetection of an object.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Transportation management systems and/or autonomous driving systems may need to constantly analyze the surroundings of a vehicle to avoid accidents such as collision with another vehicle. Such analysis may include object detection around a vehicle. The systems may communicate with a driving vehicle using radars to collect data surrounding the vehicle and then analyze the collected data for object detection. During the operation of the driving vehicle, there may be a sudden change of the road that affects the accuracy of object detection by radars. The sudden change of the road may cause the focus of the radar to be not focused on the area of interest, leading to suboptimal detection of objects on the relevant road surface, path, etc. For example, the following sudden changes of the road may negatively affect object detection by radars. Firstly, a slope of the road in front of the vehicle (e.g., approaching an uphill or a downhill part of the road) may cause the scope of the radar signals missing an object. Secondly, when the road has a curve and the vehicle makes a turn there may be a roll effect for the vehicle, which further causes a change of the elevation angle of the radar placed on the vehicle. Such change of the elevation angle may cause the scope of the radar signal to miss an object. Thirdly, a sudden change of the road condition (e.g., the road getting wet and muddy) in front of vehicle may cause significant reflections that are unwanted, which is known as clutter in radar systems. Clutter may negatively affect the accuracy of object detection.

To address the signal coverage issues caused by the sudden changes of the road, the computing system may need to adjust the beam angle of the radar to make sure the scope of the radar signals still covers the desired area for detecting an object. For example, when a vehicle is about to drive uphill, the computing system may adjust the radar signals upwards. As another example, to remove clutter, the computing system may adjust the radar signals upwards to avoid getting the unwanted reflections. The embodiments disclosed herein may be able to determine if an adjustment of the radar signal is necessary and adjust the beam angle of a radar according to the desired scope of the radar signal. In particular, the computing system may first determine if an adjustment is necessary based on different approaches including maps and sensors associated with the vehicle. The computing system may further use the data from the maps and sensors to adjust the transmission angle of the radar to offset the negative effect caused by the sudden change of the road. In particular embodiments, once detecting a sudden change of the road, the computing system may communicate such detected change to a controller of the radar and request the controller to adjust the transmission angle of the radar mechanically. In alternative embodiments, the computing system may communicate such detected change to the antennas of the radar and request the antennas to shift the beam angle of the radar. The antennas may then automatically modify the beam angle of the radar electrically without requiring mechanical adjustment. The adjustment of the beam angle may offset negative effect caused by the sudden change of the road, thereby improving the accuracy of object detection. Embodiments described herein have several advantages. One advantage is increasing the accuracy of object detection in a nearby region of an operating vehicle. This advantage may be attributed to the adaptive tilting of the radar signal associated with a radar based on the detected change of the road.

In particular embodiments, a computing system of a vehicle may access sensor data generated by one or more sensors of the vehicle. The computing system may then determine, based on the sensor data, that a first beam angle of a radar of the vehicle provides insufficient radar visibility of a current road condition according to one or more criteria. In particular embodiments, the computing system may determine an amount of adjustment needed to adjust the first beam angle of the radar. The computing system may then adjust, based on the determined amount of adjustment, the first beam angle of the radar to a second beam angle. In particular embodiments, the computing system may further detect, based on the second beam angle of the radar, one or more objects.

A directional radar antenna concentrates the transmitting energy in a narrow sector. This sector is described by the points at which the transmitted power was reduced by the half. The area within these half-power points is defined as the radar beam, and it contains nearly 80 percent of all the transmitted energy. It is usually a cone-shaped cutout from a sphere, mostly sharply focused (pencil beam), but sometimes much wider in one dimension (fan beam). With a continuous wave radar this geometric form is completely filled with the transmitted power. With very short transmission pulses, this section is not completely filled with the transmission energy, but only a small volume. A radar beam is then the path that guides the travel of the transmitted impulse. In particular embodiments, the radar beam may have an angle with respect to the road surface on which a vehicle is driving.

In particular embodiments, the one or more sensors associated with a vehicle may comprise one or more inertial measurement units (IMUs). Determining that the first beam angle of the radar of the vehicle provides insufficient radar visibility of the current road condition may be based on one or more of the IMUs. In particular embodiments, the one or more criteria may comprise one or more of a detection of an upward slope, a detection of a downward slope, an elevation angle of the radar, a number of reflected signals associated with the radar, a signal range associated with the radar, or a probability of misdetection of targets by the radar based on the first beam angle. In particular embodiments, the probability of misdetection of targets may indicate the likelihood of failing to detect targets that are in the field of view of a radar. The probability of misdetection may be calculated as follows. The received and demodulated echo signal of a radar may be processed by a threshold logic. This threshold may be balanced so that as of a certain amplitude, wanted signals may pass and noise may be removed. Since high noise tops exist in the mixed signal, which lie in the range of small wanted signals, the optimized threshold level may be a compromise. Wanted signals may, on the one hand, reach the indication as of a minimal amplitude. On the other hand, the false alarm rate may not increase. The probability of misdetection may be the ratio of misdetected targets to the number of all possible targets in a given direction. In particular embodiments, determining that the first beam angle of the radar of the vehicle provides insufficient radar visibility of the current road condition according to one or more criteria may comprise the following steps. The computing system may first transmit, by the radar, one or more signals. The computing system may then receive one or more reflected signals of the one or more transmitted signals being reflected by one or more objects. The computing system may further analyze the one or more reflected signals according to the one or more criteria. The analysis may reveal that the one or more criteria are satisfied, based on the computing system determining that the first beam angle of the radar of the vehicle provides insufficient radar visibility of the current road condition.

Figure 1D:
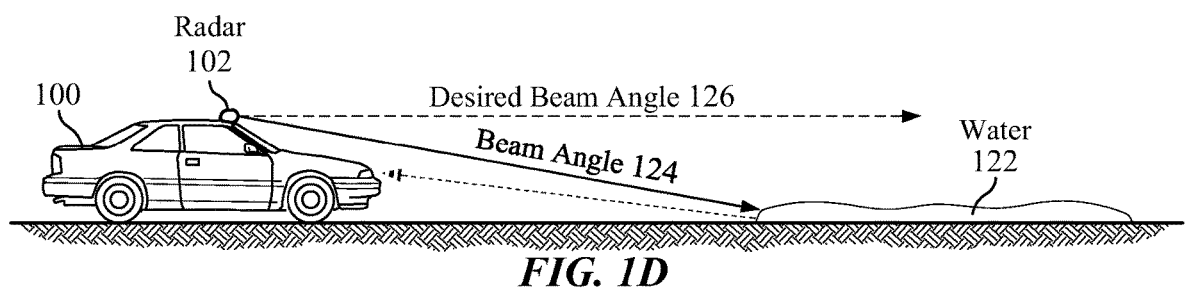
FIG. 1D illustrates another example change of road that causes misdetection of an object
Figure 1E:
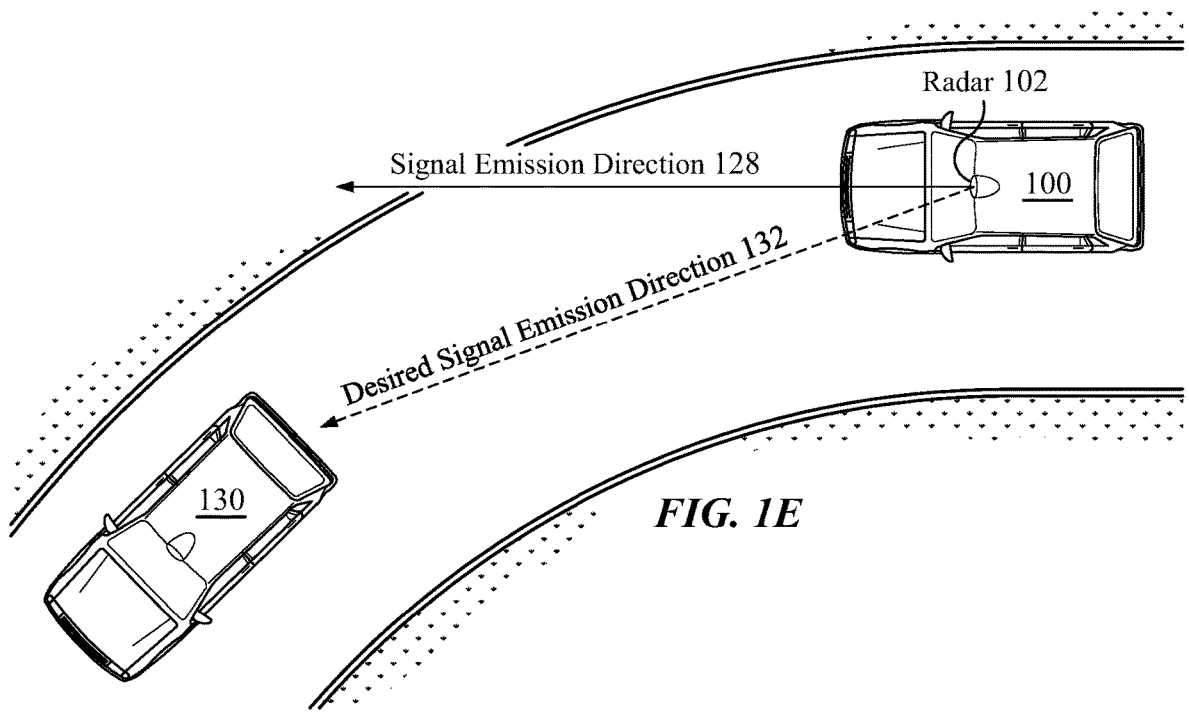
FIG. 1E illustrates another example change of road that causes misdetection of an object.

FIGS. 1A-1E illustrate example scenarios where a sudden change of the road may cause misdetection of an object. FIG. 1A illustrates an example change of road that causes misdetection of an object. In FIG. 1A, there is a driving vehicle 100. A radar 102 is placed on the rooftop of the vehicle 100, which is used for vehicle operation. In particular embodiments, the radar 102 may be used to detect nearby objects. The radar 102 may emit a signal in a beam angle 106. The vehicle 100 is approaching a slope of an uphill. There is another vehicle 108, which is already going uphill. As indicated by FIG. 1A, the emitted signal may misdetect vehicle 108 because of the bean angle 106. As can been seen, a desired beam angle 110 may be what is needed for detecting the object, i.e., vehicle 108. FIG. 1B illustrates another example change of road that causes misdetection of an object. As displayed in FIG. 1B, the vehicle 100 is approaching a slope of a downhill. The radar 102 may emit a signal in a beam angle 112. There is another vehicle 112, which is already going downhill. As indicated by FIG. 1B, the emitted signal may misdetect vehicle 114. As can been seen, a desired beam angle 116 may be what is needed for more accurate object detection. FIG. 1C illustrates another example change of road that causes misdetection of an object. As displayed in FIG. 1C, the vehicle 100 is making a turn, which leads to a roll effect. The roll effect may cause a correlation between the azimuth angle and the elevation angle 118, which may affect the accurate detection of an object by radar 102 placed on the vehicle 100. This is because a radar may need three pieces of information, i.e., the azimuth angle, the elevation angle, and the distance from the radar to the object, to determine the location of the object. As can been seen, a desired elevation angle 120 may be what is needed for more accurate object detection. FIG. 1D illustrates another example change of road that causes misdetection of an object. As displayed in FIG. 1D, the vehicle 100 is approaching some parts of the road that have water 122 on the ground. The radar 102 may emit a signal in a beam angle 124. The water 122 may cause a lot of unwanted reflections to the emitted signals, which may affect the accuracy of object detection. As can been seen, a desired elevation angle 126 may be what is needed for more accurate object detection. FIG. 1E illustrates another example change of road that causes misdetection of an object. As displayed in FIG. 1E, the vehicle 100 is making a turn, which leads to a yaw effect. The radar 102 may emit a signal with a signal emission direction 128. There is another vehicle 130 in front of the vehicle. The yaw effect may cause the emitted signal to misdetect the vehicle 130. As can been seen, a desired emitting direction 132 may be what is needed for more accurate object detection.

Figure 2A:
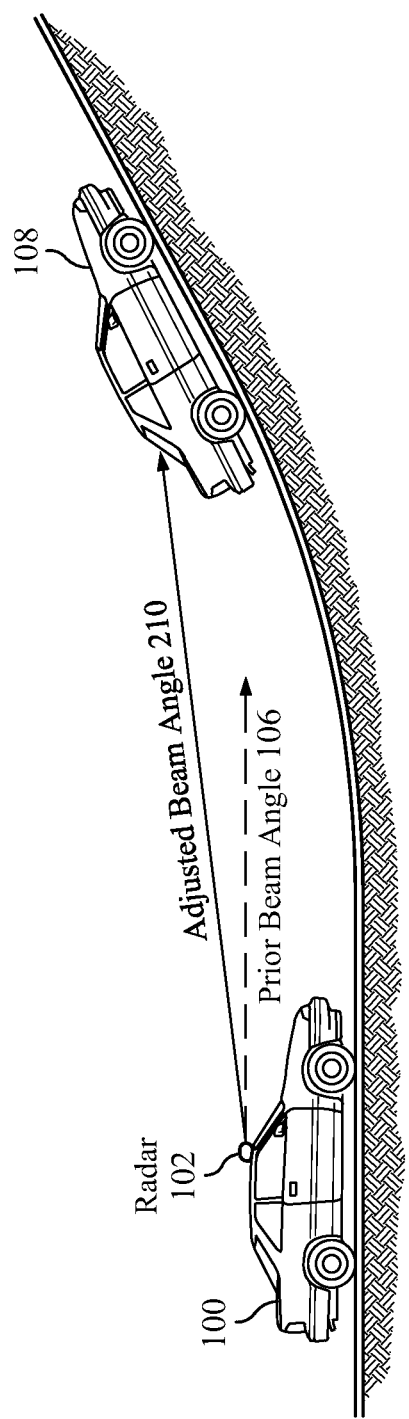
FIG. 2A illustrates an example adjustment of the beam angle of the radar corresponding to FIG. 1A.

FIGS. 2A-2E illustrate example adjustments of the beam angle of the radar 102 corresponding to FIGS. 1A-1E. FIG. 2A illustrates an example adjustment of the beam angle of the radar 102 corresponding to FIG. 1A. When the example change of road in FIG. 1A happens, the computing system may determine that the first beam angle of the radar 102 provides insufficient radar visibility of the current road condition according to the one or more criteria. As an example and not by way of limitation, the criteria for the situation in FIG. 1A may be a detection of an upward slope. The detection may be based on sensor data such as images and videos captured by a camera associated with the vehicle 100, or any suitable sensor data. As another example and not by way of limitation, the criteria for the situation in FIG. 1A may be a signal range associated with the radar 102. For the situation as shown in FIG. 1A, the signal range may decrease because of the upward slope. As yet another example and not by way of limitation, the criteria for the situation in FIG. 1A may be a probability of misdetection of targets by the radar 102. For the situation as shown in FIG. 1A, the probability of misdetection of targets may increase because the reflected signal received at the radar 102 are mostly from the upward slope. The computing system may further determine that the upward slope may cause the first beam angle of the radar 102 to provide insufficient radar visibility of the current road condition according to the aforementioned example criteria. As displayed in FIG. 2A, the computing system may then adaptively tilt the radar 102, after which the emitted signal may detect the object (i.e., vehicle 108) from the uphill. In addition, based on the detected upward slope, the computing system may determine to tilt the radar 102 upwards. As indicated in FIG. 2A, the tilting of the radar may result in an adjusted beam angle 210, which is upwards compared to the prior beam angle.

Figure 2B:
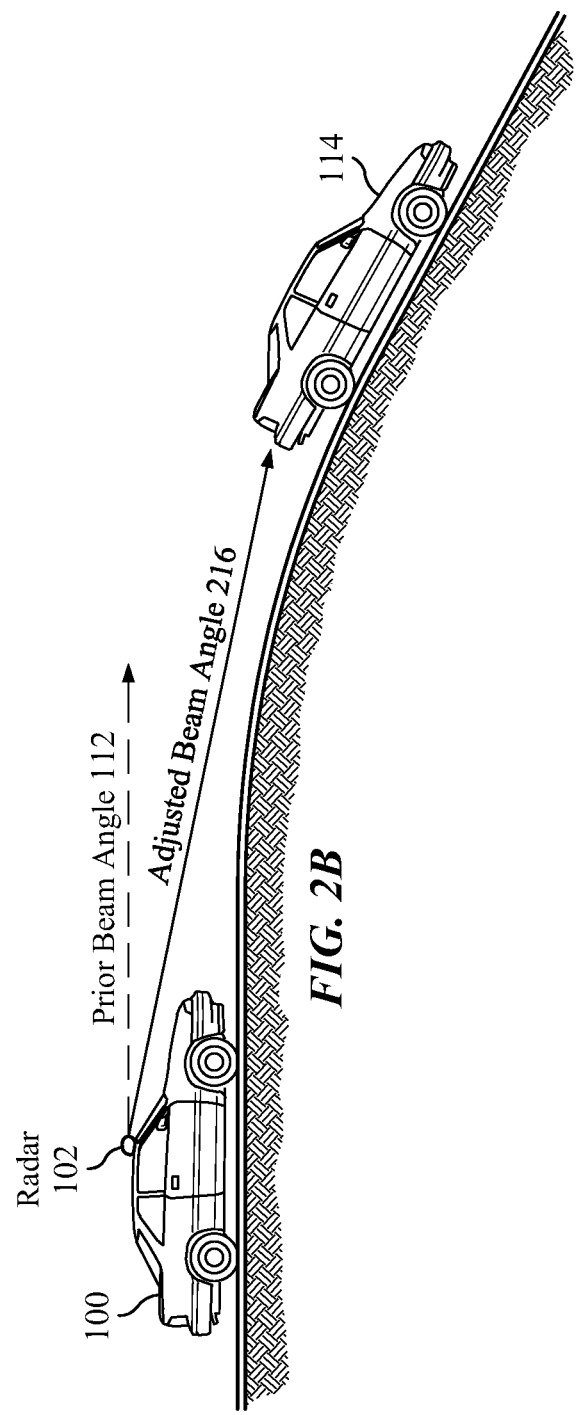
FIG. 2B illustrates an example adjustment of the beam angle of the radar corresponding to FIG. 1B.

FIG. 2B illustrates an example adjustment of the beam angle of the radar 102 corresponding to FIG. 1B. When the example change of road in FIG. 1B happens, the computing system may determine that the first beam angle of the radar 102 provides insufficient radar visibility of the current road condition according to the one or more criteria. As an example and not by way of limitation, the criteria for the situation in FIG. 1B may be a detection of a downward slope. The detection may be based on sensor data such as images and videos captured by a camera associated with the vehicle 100, or any suitable sensor data. As another example and not by way of limitation, the criteria for the situation in FIG. 1B may be a number of reflected signals associated with the radar 102. For the situation as shown in FIG. 1B, the number of reflected signals may decrease because of the downward slope, i.e., no objects reflecting the radar signals which leads to reduced number of reflected signals (e.g., 0). As yet another example and not by way of limitation, the criteria for the situation in FIG. 1B may be a probability of misdetection of targets by the radar 102. For the situation as shown in FIG. 1B, the probability of misdetection of targets may increase because the number of reflected signals received at the radar 102 decreases significantly, which may further cause suboptimal target detection, i.e., increased probability of misdetection. The computing system may further determine that the downward slope may cause the first beam angle of the radar 102 to provide insufficient radar visibility of the current road condition according to the aforementioned example criteria. As displayed in FIG. 2B, the computing system may adaptively tilt the radar 102, after which the emitted signal may detect the object (i.e., vehicle 114) from the downhill. In addition, based on the detected downward slope, the computing system may determine to tilt the radar 102 downwards. As indicated in FIG. 2B, the tilting of the radar 102 may result in an adjusted beam angle 216, which is downwards compared to the prior beam angle.

Figure 2C:
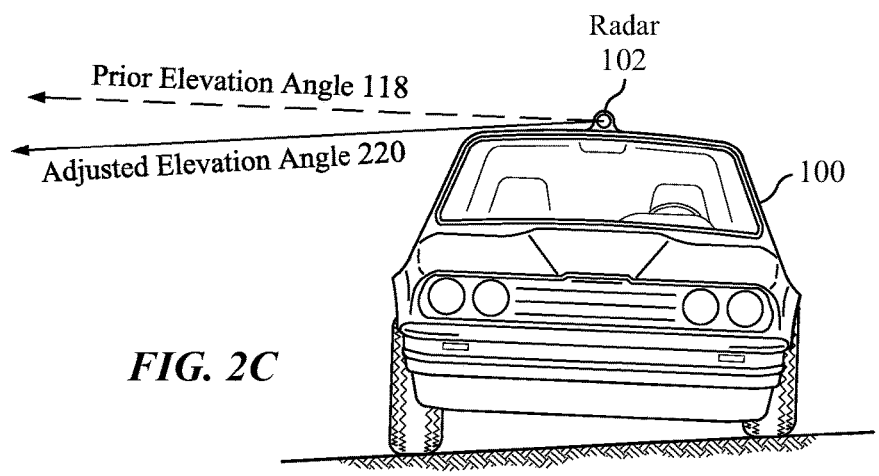
FIG. 2C illustrates an example adjustment of the elevation angle of the radar corresponding to FIG. 1C.

FIG. 2C illustrates an example adjustment of the elevation angle of the radar 102 corresponding to FIG. 1C. When the example change of road in FIG. 1C happens, the computing system may determine that the elevation angle of the radar 102 provides insufficient radar visibility of the current road condition according to the one or more criteria. As an example and not by way of limitation, the criteria for the situation in FIG. 1C may be an elevation angle of the radar 102. For the situation as shown in FIG. 1C, the elevation angle of the radar may increase more than a threshold value, e.g., 10 degrees. As yet another example and not by way of limitation, the criteria for the situation in FIG. 1C may be a probability of misdetection of targets by the radar 102. For the situation as shown in FIG. 1C, the probability of misdetection of targets may increase because the elevation angle of the radar may lead to its signal not covering possible targets in the field of view. The computing system may further determine that the increase of the elevation angle may cause the radar 102 to have insufficient radar visibility of the current road condition according to the aforementioned example criteria. As displayed in FIG. 2C, the computing system may then adaptively adjust the elevation angle to offset the roll effect. In addition, based on the increased elevation angle, the computing system may determine to reduce the elevation angle. As indicated in FIG. 2C, the tilting of the radar 102 may result in an adjusted elevation angle 220, thereby increasing the accuracy of object detection.

Figure 2D:
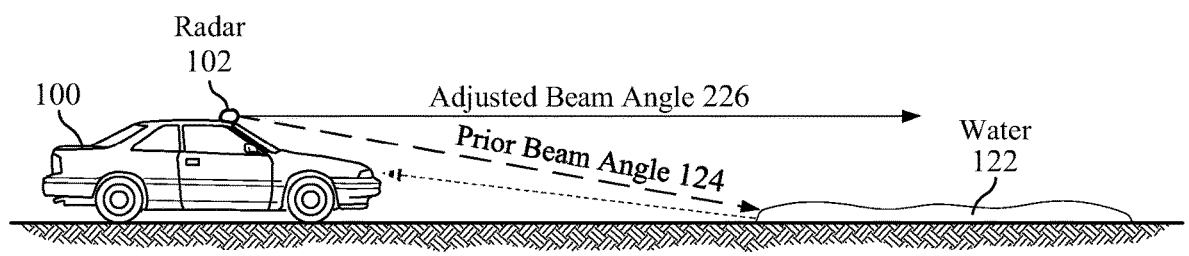
FIG. 2D illustrates an example adjustment of the beam angle of the radar corresponding to FIG. 1D.

FIG. 2D illustrates an example adjustment of the beam angle of the radar 102 corresponding to FIG. 1D. When the example change of road in FIG. 1D happens, the computing system may determine that the first beam angle of the radar 102 provides insufficient radar visibility of the current road condition according to the one or more criteria. As an example and not by way of limitation, the criteria for the situation in FIG. 1D may be a number of reflected signals associated with the radar 102. For the situation as shown in FIG. 1D, the number of reflected signals may increase because of the water 122 on the ground. As another example and not by way of limitation, the criteria for the situation in FIG. 1D may be a probability of misdetection of targets by the radar 102. For the situation as shown in FIG. 1D, the probability of misdetection of targets may increase because the reflected signals by the water 122 are noise to the radar 102. The computing system may further determine that the increased number of reflected signals may cause the first beam angle of the radar 102 to provide insufficient radar visibility of the current road condition according to the aforementioned example criteria. As displayed in FIG. 2D, the computing system may then adaptively tilt the radar 102, after which the radar 102 may avoid receiving reflected signals by the water 122 on the ground. In addition, based on the angle of the increased reflected signals, the computing system may determine to tilt the radar 102 upwards. As indicated in FIG. 2D, the tilting of the radar 102 may result in an adjusted beam angle 226, which is upwards compared to the prior beam angle 124.

Figure 2E:
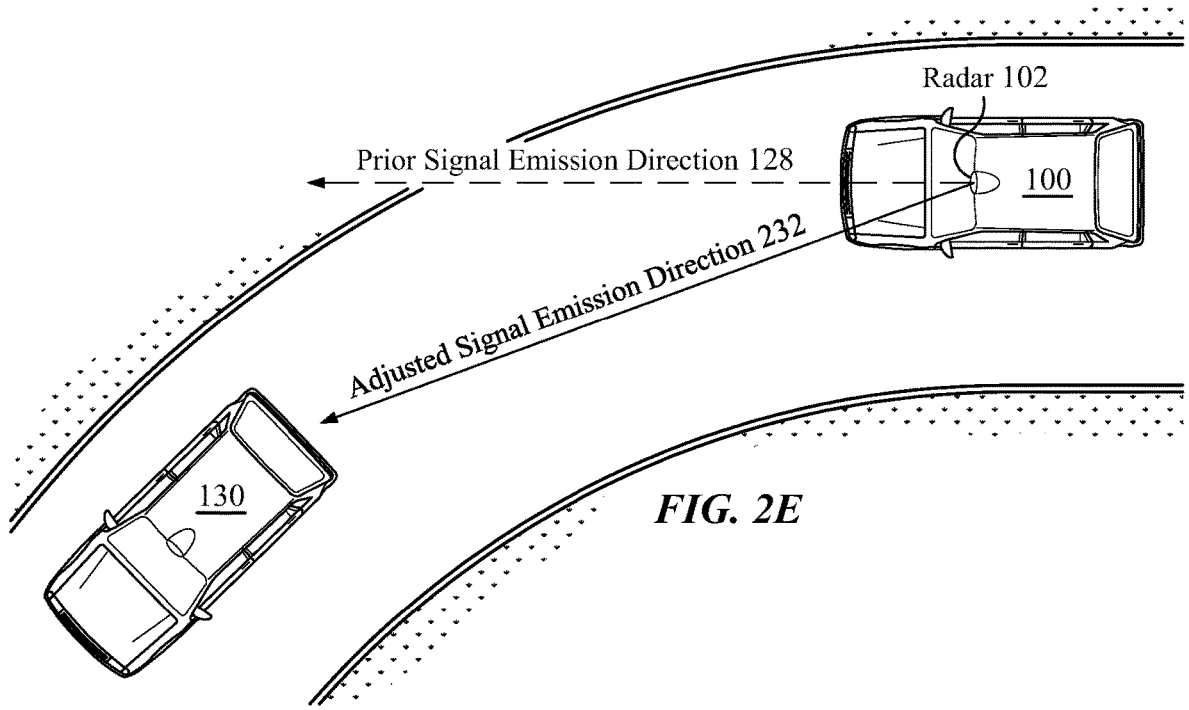
FIG. 2E illustrates an example adjustment of the emission direction of the radar corresponding to FIG. 1E.

FIG. 2E illustrates an example adjustment of the emission direction of the radar 102 corresponding to FIG. 1E. When the example change of road in FIG. 1E happens, the computing system may determine that the emission direction of the radar 102 provides insufficient radar visibility of the current road condition according to the one or more criteria. As an example and not by way of limitation, the criteria for the situation in FIG. 1E may be a number of reflected signals associated with the radar 102. For the situation as shown in FIG. 1E, the number of reflected signals may decrease because the target 130 gets out of the field of view of the radar 102. As another example and not by way of limitation, the criteria for the situation in FIG. 1E may be a probability of misdetection of targets by the radar 102. For the situation as shown in FIG. 1E, the probability of miss-detection of targets may increase because the reflected signals received at the radar 102 reduce significantly, which may affect the probability of misdetection. The computing system may further determine that the emission direction may cause the radar 102 to have insufficient radar visibility of the current road condition according to the aforementioned example criteria. As displayed in FIG. 2E, the computing system may then adaptively adjust the emission direction to offset the yaw effect. In addition, based on the angle of the emission direction with respect to the turn of the road, the computing system may determine to tilt the radar 102 inwards. As displayed in FIG. 2E, the adjustment of the radar 102 may result in an adjusted signal emission direction 232, thereby avoid the misdetection of the object.

Figure 3:
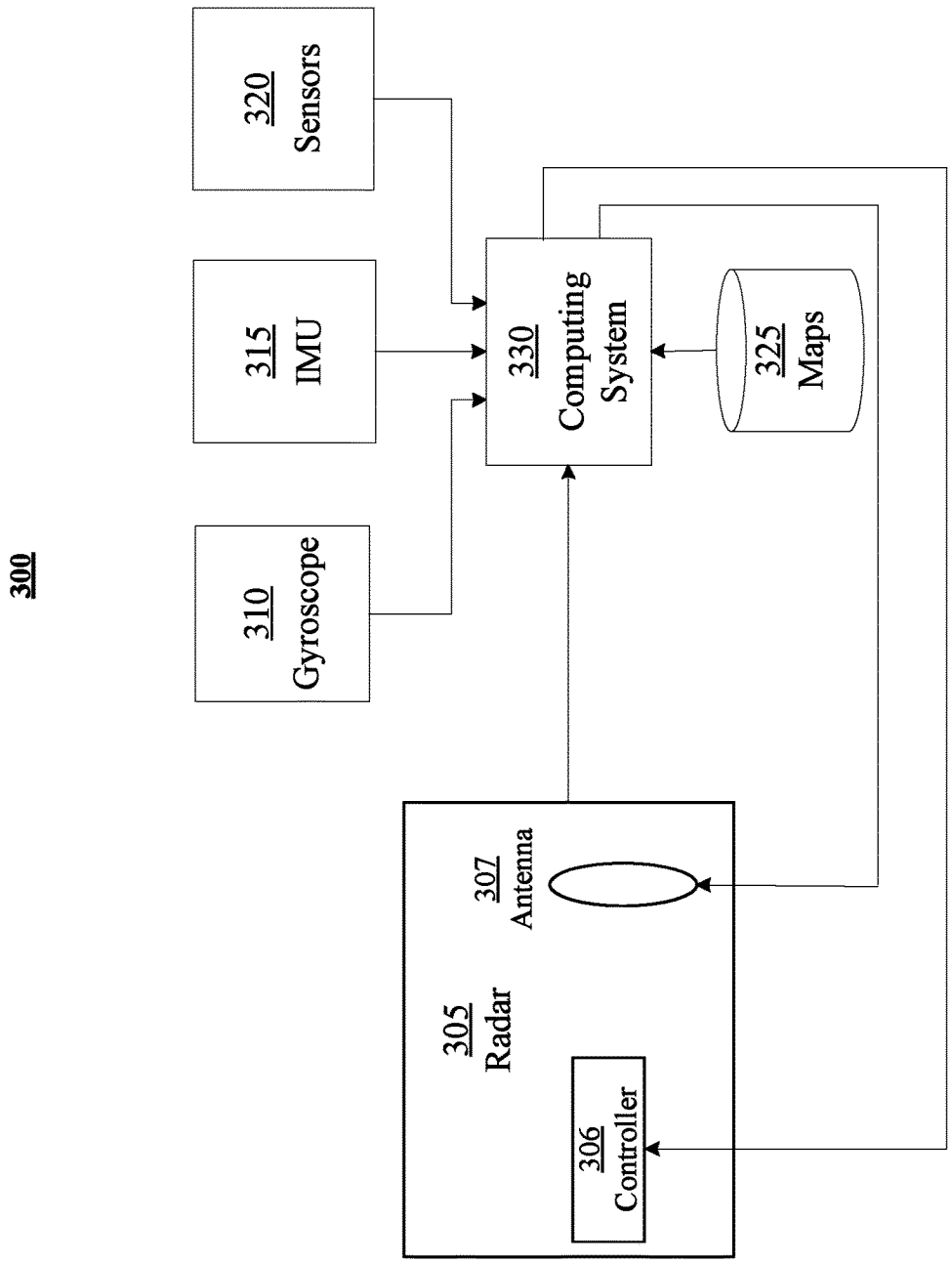
FIG. 3 illustrates an example diagram flow for adaptively tilting a radar of a vehicle.

FIG. 3 illustrates an example diagram flow for adaptively tilting a radar of a vehicle. A radar 305 may comprise a controller 306, which may be used to mechanically adjust the beam angle of the radar 305. The radar 305 may emit and receive signals via its antenna 307. The radar 305 may send its received signals to the computing system 330. When the computing system 330 needs to determine if the beam angle of the radar 305 provides insufficient radar visibility of the current road condition, the computing system 330 may access sensor data generated by one or more sensors of the vehicle. FIG. 3 illustrates that these sensors may comprise gyroscope 310, IMU 315, and other suitable sensors 320. As an example and not by way of limitation, sensors 320 may comprise cameras, LiDAR, GPS receivers, etc. In addition, the computing system 330 may also access different maps 325 stored in a server. The computing system 330 may then jointly analyze the radar signals, the sensor data from gyroscope 310, IMU 315, and sensors 320, and the geographical information from the maps 325. Based on such analysis, the computing system 330 may determine that the beam angle of the radar 305 provides insufficient radar visibility of the current road condition according to the one or more criteria. The computing system 330 may further determine how much adjustment is needed and how to adjust the beam angle of the radar 305. The determination may be sent back the radar 305. There may be two ways to adjust the beam angle of the radar 305. The first way may be to mechanically adjust the beam angle of the radar 305, for which the computing system 330 may send the determination to the controller 306. Based on the determination, the controller 306 may further adjust the beam angle of the radar 305. The second way may be to electronically adjust the beam angle, for which the computing system 330 may send the determination to the antenna 307. The antenna 307 may then electronically adjust the beam angle of the radar 305.

In particular embodiments, the computing system may determine the current road condition based on location information associated with the vehicle and one or more maps. As an example and not by way of limitation, the location information may indicate that the vehicle is at Lombard Street in San Francisco. The maps may provide information indicating that Lombard Street is a steep, one-block section with eight hairpin turns. Accordingly, the computing system may determine the current road condition as downhill with sharp turns. In particular embodiments, the computing system may determine the current road condition based on an analysis of the sensor data by a machine-learning model. In particular embodiments, the machine-learning model may be based on scene recognition. As an example and not by way of limitation, the sensor data may comprise images and videos captured by cameras installed on the vehicle. The computing system may perform scene recognition on the images and videos to determine the current road condition, e.g., an uphill slope.

In particular embodiments, the current road condition may comprise one or more of a slope of a road, a turn of the road, or reflective objects on the road. In particular embodiments, how to adjust the beam angle of the radar may depend on the current road condition. In particular embodiments, the current road condition may comprise a slope of the road based on a rising surface, e.g., an uphill part of the road. Accordingly, adjusting the first beam angle of the radar to the second beam angle may comprise adjusting the beam angle of the radar upwards. In particular embodiments, the current road condition may comprise a slope of the road based on a falling surface, e.g., a downhill part of the road. Accordingly, adjusting the first beam angle of the radar to the second beam angle may comprise adjusting the beam angle of the radar downwards. In particular embodiments, the current road condition may comprise reflective objects on the road. As an example and not by way of limitation, the reflective objects on the road may be a stopper comprising metal objects. Accordingly, adjusting the first beam angle of the radar to the second beam angle may comprise adjusting the beam angle of the radar upwards.

In particular embodiments, the one or more sensors of the vehicle may comprise one or more gyroscopes. A gyroscope is a device used for measuring or maintaining orientation and angular velocity. Accordingly, determining the amount of adjustment needed to adjust the first beam angle of the radar may comprise analyzing the sensor data by one or more of the gyroscopes. In particular embodiments, the one or more sensors may comprise one or more IMUs. Accordingly, determining the amount of adjustment needed to adjust the first beam angle of the radar may comprise analyzing the sensor data by one or more of the IMUs. As an example and not by way of limitation, the IMUs may communicate the angle of the current slope of the vehicle to the vehicle. The computing system may then compare the angle of the current slope with the angle of the prior slope and determine the amount of adjustment accordingly.

In particular embodiments, the computing system may continuously adjust the beam angle until an ending condition is reached. In particular embodiments, determining if the adjustment should end may be based on a threshold number of detected objects. The computing system may detect objects in nearby regions of a vehicle based on the adjusted beam angle of the radar. The computing system may then compare the number of the detected objects with the threshold number. The computing system may continuously adjust the beam angle of the radar until the number of detected objects equals the threshold number.

In alternative embodiments, the computing system may use two radars and adaptively tilt each of them for more accurate object detection. Each radar may be associated with a respective beam angle. In particular embodiments, the computing system may determine that both beam angles of both radars of the vehicle provide insufficient radar visibility of a current road condition according to the one or more criteria. After that, the computing system may tilt each radar differently. As an example and not by way of limitation, the computing system may tilt the first radar upwards for a predetermined angle and the second radar downwards for the predetermined angle. Each radar may then emit signals using their respective adjusted beam angles, which may be reflected back by an object. The reflected signal may be associated with a received signal strength indication (RSSI). In particular embodiments, the computing system may further compare the two RSSIs of the two radars and determine the amount of adjustment for each radar accordingly.

Figure 4:
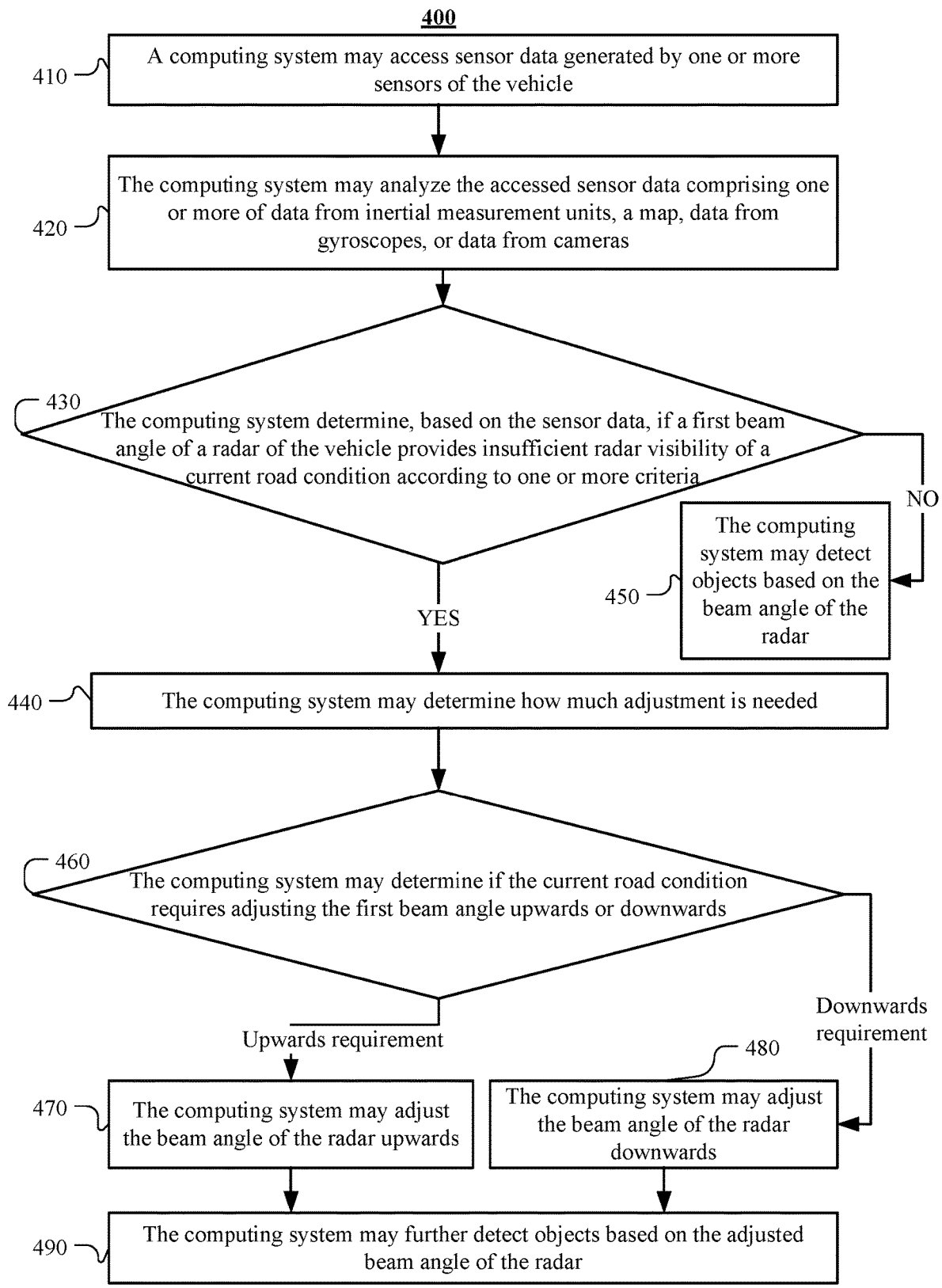
FIG. 4 illustrates an example method for adaptive tilting of a radar.

FIG. 4 illustrates an example method 400 for adaptive tilting of a radar. The method may begin at step 410, where a computing system may access sensor data generated by one or more sensors of the vehicle. At step 420, the computing system may analyze the accessed sensor data comprising one or more of data from inertial measurement units, a map, data from gyroscopes, or data from cameras. At step 430, the computing system may determine, based on the sensor data, if a first beam angle of a radar of the vehicle provides insufficient radar visibility of a current road condition according to one or more criteria. If the first beam angle of the radar of the vehicle provides insufficient radar visibility of the current road condition according to the one or more criteria, the computing system may proceed to step 440, where the computing system may determine how much adjustment is needed. If the first beam angle of the radar of the vehicle provides sufficient radar visibility of the current road condition according to the one or more criteria, the computing system may proceed to step 450, where the computing system may detect objects based on the beam angle of the radar. After step 450, the computing system may proceed to step 460, where the computing system may determine if the current road condition requires adjusting the first beam angle upwards or downwards. After step 460, the computing system may perform different steps according to the requirement. If the current road condition requires adjusting the first beam angle upwards, the computing system may proceed to step 470, where the computing system may adjust the beam angle upwards. If the current road condition requires adjusting the first beam angle downwards, the computing system may proceed to step 480, where the computing system may adjust the beam angle of the radar downwards. At step 490, the computing system may further detect objects based on the adjusted beam angle of the radar. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for adaptive tilting of a radar including the particular steps of the method of FIG. 4, this disclosure contemplates any suitable method for adaptive tilting of a radar including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
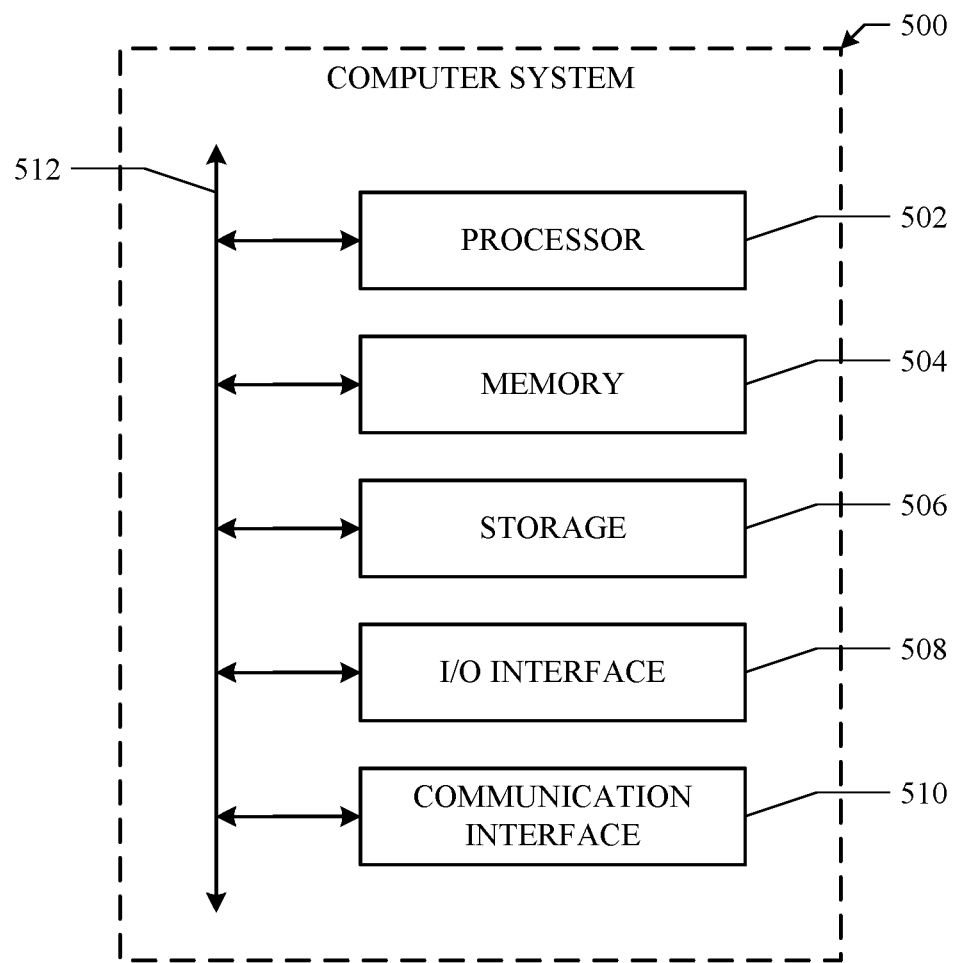
FIG. 5 illustrates an example of a computing system.

FIG. 5 illustrates an example computer system 500. In particular embodiments, one or more computer systems 500 perform one or more steps of one or more methods described or illustrated herein. In particular embodiments, one or more computer systems 500 provide the functionalities described or illustrated herein. In particular embodiments, software running on one or more computer systems 500 performs one or more steps of one or more methods described or illustrated herein or provides the functionalities described or illustrated herein. Particular embodiments include one or more portions of one or more computer systems 500. Herein, a reference to a computer system may encompass a computing device, and vice versa, where appropriate. Moreover, a reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (IO) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 that are to be operated on by computer instructions; the results of previous instructions executed by processor 502 that are accessible to subsequent instructions or for writing to memory 504 or storage 506; or any other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs), be a multi-core processor, or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described in further detail below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system of a vehicle:

accessing sensor data generated by one or more sensors of the vehicle;

determining, based on the sensor data, that a first beam angle of a radar of the vehicle provides insufficient radar visibility of a current road condition according to one or more criteria that relate to whether a field-of-view of the radar capture a defined area of the current road;

determining an amount of adjustment needed to adjust the first beam angle of the radar to resolve the insufficient radar visibility;

adjusting, based on the determined amount of adjustment, the first beam angle of the radar to a second beam angle; and detecting, based on the second beam angle of the radar, one or more objects.

2. The method of claim 1, wherein the one or more criteria comprise one or more of:

a detection of an upward slope;
a detection of a downward slope;
an elevation angle of the radar;
a number of reflected signals of the radar;
a signal range associated with the radar; or
a probability of misdetection of targets by the radar based on the first beam angle.

3. The method of claim 1, wherein determining that the first beam angle of the radar of the vehicle provides insufficient radar visibility of the current road condition comprises:

transmitting, by the radar, one or more signals;
receiving one or more reflected signals of the one or more transmitted signals being reflected by one or more objects; and
analyzing the one or more reflected signals according to the one or more criteria.

4. The method of claim 1, wherein the one or more sensors comprise one or more inertial measurement units (IMUs), and wherein determining that the first beam angle of the radar of the vehicle provides insufficient radar visibility of the current road condition is based on one or more of the IMUs.

5. The method of claim 1, wherein the current road condition comprises one or more of:
- a slope of a road;
- a turn of the road; or
- reflective objects on the road.

6. The method of claim 5, wherein the current road condition comprises a slope of the road based on a rising surface, and wherein adjusting the first beam angle of the radar to the second beam angle comprises adjusting the beam angle of the radar upwards.

7. The method of claim 5, wherein the current road condition comprises a slope of the road based on a falling surface, and wherein adjusting the first beam angle of the radar to the second beam angle comprises adjusting the beam angle of the radar downwards.

8. The method of claim 5, wherein the current road condition comprises reflective objects on the road, and wherein adjusting the first beam angle of the radar to the second beam angle comprises adjusting the beam angle of the radar upwards.

9. The method of claim 1, further comprising determining the current road condition based on location information associated with the vehicle and one or more maps.

10. The method of claim 1, further comprising determining the current road condition based on an analysis of the sensor data by a machine-learning model, wherein the machine-learning model is based on scene recognition.

11. The method of claim 1, wherein the one or more sensors comprise one or more inertial measurement units (IMUs), and wherein determining the current road condition is based on one or more of the IMUs.

12. The method of claim 1, wherein the one or more sensors comprise one or more gyroscopes, and wherein determining the amount of adjustment needed to adjust the first beam angle of the radar comprises analyzing the sensor data by one or more of the gyroscopes.

13. A system comprising: one or more processors and one or more computer-readable non-transitory storage media coupled to one or more of the processors, the one or more computer-readable non-transitory storage media comprising instructions operable when executed by one or more of the processors to cause the system to:
- access sensor data generated by one or more sensors of a vehicle;
- determine, based on the sensor data, that a first beam angle of a radar of the vehicle provides insufficient radar visibility of a current road condition according to one or more criteria that relate to whether a field-of-view of the radar capture a defined area of the current road;
- determine an amount of adjustment needed to adjust the first beam angle of the radar to resolve the insufficient radar visibility;
- adjust, based on the determined amount of adjustment, the first beam angle of the radar to a second beam angle; and
- detect, based on the second beam angle of the radar, one or more objects.

14. The system of claim 13, wherein the one or more criteria comprise one or more of:
- a detection of an upward slope;
- a detection of a downward slope;
- an elevation angle of the radar;
- a number of reflected signals of the radar;
- a signal range associated with the radar; or
- a probability of misdetection of targets by the radar based on the first beam angle.

15. The system of claim 13, wherein determining that the first beam angle of the radar of the vehicle provides insufficient radar visibility of the current road condition comprises:
- transmitting, by the radar, one or more signals;
- receiving one or more reflected signals of the one or more transmitted signals being reflected by one or more objects; and
- analyzing the one or more reflected signals according to the one or more criteria.

16. The system of claim 13, wherein the one or more sensors comprise one or more inertial measurement units (IMUs), and wherein determining that the first beam angle of the radar of the vehicle provides insufficient radar visibility of the current road condition is based on one or more of the IMUs.

17. The system of claim 13, wherein the current road condition comprises one or more of:
- a slope of a road;
- a turn of the road; or
- reflective objects on the road.

18. The system of claim 17, wherein the current road condition comprises a slope of the road based on a rising surface, and wherein adjusting the first beam angle of the radar to the second beam angle comprises adjusting the beam angle of the radar upwards.

19. The system of claim 17, wherein the current road condition comprises a slope of the road based on a falling surface, and wherein adjusting the first beam angle of the radar to the second beam angle comprises adjusting the beam angle of the radar downwards.

20. One or more computer-readable non-transitory storage media embodying software that is operable when executed to cause one or more processors to perform operations comprising:
- accessing sensor data generated by one or more sensors of a vehicle;
- determining, based on the sensor data, that a first beam angle of a radar of the vehicle provides insufficient radar visibility of a current road condition according to one or more criteria that relate to whether a field-of-view of the radar capture a defined area of the current road;
- determining an amount of adjustment needed to adjust the first beam angle of the radar to resolve the insufficient radar visibility;
- adjusting, based on the determined amount of adjustment, the first beam angle of the radar to a second beam angle; and
- detecting, based on the second beam angle of the radar, one or more objects.

* * * * *